(12) United States Patent
Chou et al.

(10) Patent No.: US 11,689,862 B2
(45) Date of Patent: Jun. 27, 2023

(54) TRANSPARENT ELECTROSTATIC TRANSDUCERS

(71) Applicant: GRAPHAUDIO INC., Beverly Hills, CA (US)

(72) Inventors: Harry Chou, Austin, TX (US); Jeff Maag, Belmont, CA (US); Burt Fowler, Buda, TX (US); Lorance Wilson, San Jose, CA (US)

(73) Assignee: GRAPHAUDIO INC., Beverly Hills, CA (US)

( * ) Notice: Subject to any disclaimer, the term of this patent is extended or adjusted under 35 U.S.C. 154(b) by 12 days.

(21) Appl. No.: 17/273,942

(22) PCT Filed: Sep. 6, 2019

(86) PCT No.: PCT/US2019/049860
§ 371 (c)(1),
(2) Date: Mar. 5, 2021

(87) PCT Pub. No.: WO2020/051401
PCT Pub. Date: Mar. 12, 2020

(65) Prior Publication Data
US 2021/0337316 A1 Oct. 28, 2021

Related U.S. Application Data

(60) Provisional application No. 62/728,099, filed on Sep. 7, 2018.

(51) Int. Cl.
*H04R 19/02* (2006.01)
*B32B 7/12* (2006.01)
(Continued)

(52) U.S. Cl.
CPC ............... *H04R 19/02* (2013.01); *B32B 7/12* (2013.01); *B32B 9/007* (2013.01); *B32B 37/12* (2013.01);
(Continued)

(58) Field of Classification Search
CPC ........ H04R 19/02; H04R 1/028; H04R 1/403; H04R 1/406; H04R 3/005; H04R 3/12;
(Continued)

(56) References Cited

U.S. PATENT DOCUMENTS 6,785,393 B2 * 8/2004 Lipponen ................. H04R 7/08
381/174
7,468,575 B2 * 12/2008 Pelrine ................ H01L 41/0478
310/365

(Continued)

FOREIGN PATENT DOCUMENTS

DE 102018203098 * 6/2019

OTHER PUBLICATIONS

International Search Report, PCT/US2019/049860, dated Nov. 26, 2019, 1 pg.
(Continued)

*Primary Examiner* — Disler Paul
(74) *Attorney, Agent, or Firm* — Paul D. Strain, Esq.; Strain & Strain PLLC

(57) ABSTRACT

The Application relates to optically transparent electrostatic transducers. In some embodiments, the transducers comprise graphene. Such transducers are capable of functioning as acoustic sensors and/or transmitters as a singulated device or in an array configuration. Also provided are methods of manufacturing and using such transducers.

29 Claims, 4 Drawing Sheets

(51) Int. Cl.
  *B32B 9/00* (2006.01)
  *B32B 37/12* (2006.01)
  *B32B 38/00* (2006.01)
  *H04R 1/02* (2006.01)
  *H04R 1/40* (2006.01)
  *H04R 3/00* (2006.01)
  *H04R 3/12* (2006.01)
  *H04R 7/10* (2006.01)
  *H04R 19/04* (2006.01)
  *H04R 31/00* (2006.01)

(52) U.S. Cl.
  CPC ........... *B32B 38/145* (2013.01); *H04R 1/028* (2013.01); *H04R 1/403* (2013.01); *H04R 1/406* (2013.01); *H04R 3/005* (2013.01); *H04R 3/12* (2013.01); *H04R 7/10* (2013.01); *H04R 19/04* (2013.01); *H04R 31/00* (2013.01); *B32B 2038/0064* (2013.01); *B32B 2307/20* (2013.01); *B32B 2307/412* (2013.01); *B32B 2457/00* (2013.01); *H04R 2307/023* (2013.01); *H04R 2400/01* (2013.01); *H04R 2499/15* (2013.01)

(58) Field of Classification Search
  CPC .......... H04R 7/10; H04R 19/04; H04R 31/00; H04R 2307/023; H04R 2400/01; H04R 2499/15
  USPC .......................................................... 29/594
  See application file for complete search history.

(56) References Cited

U.S. PATENT DOCUMENTS

| | | | |
|---|---|---|---|
| 8,601,658 | B2 | 12/2013 | Bulovic et al. |
| 9,769,573 | B2* | 9/2017 | Hecht ...................... H04R 7/08 |
| 10,692,977 | B2* | 6/2020 | Withers .................. H01L 33/26 |
| 11,190,868 | B2* | 11/2021 | Murarka ............. H04R 19/005 |
| 2004/0004988 | A1* | 1/2004 | Cok .................... H01L 51/5265 |
| | | | 372/70 |
| 2006/0166698 | A1 | 7/2006 | Saiki et al. |
| 2007/0081681 | A1 | 4/2007 | Yu et al. |
| 2008/0085019 | A1 | 4/2008 | Wagenaars et al. |
| 2016/0025669 | A1 | 1/2016 | College |
| 2016/0277843 | A1 | 9/2016 | Babayoff et al. |
| 2018/0066980 | A1 | 3/2018 | Zhou et al. |

OTHER PUBLICATIONS

A. B. Kuzmenko et al., Universal optical conductance of graphite, Phys. Rev. Lett. Vol. 100, 117401 (2008).

L. Song et al., Large scale growth and characterization of atomic hexagonal boron nitride layers, Nano Lett. vol. 10, 3209-3215 (2010).

Kyoung-Ryul Lee et al., "Acoustic performance of dual-electrode electrostatic sound generators based on CVD graphene on polyimide film", Nanotechnology, Institute of Physics Publishing, Bristol, vol. 29, No. 32, p. 325502 (Jun. 7, 2018); XP020329539.

* cited by examiner

TRANSPARENT ELECTROSTATIC TRANSDUCERS

INCORPORATION BY REFERENCE OF RELATED PATENT APPLICATIONS

This application is a National Stage of International Application No. PCT/US2019/049860 filed Sep. 6, 2019, which is based upon and claims priority under 35 U.S.C. § 119(e) to U.S. provisional application U.S. Ser. No. 62/728,099 filed Sep. 7, 2018, the entire contents of all of which are incorporated herein by reference in their entirety.

BACKGROUND

The application relates to optically transparent electrostatic transducers. Such transducers are capable of functioning as acoustic sensors and/or transmitters as a singulated device or in an array configuration. Prior transducers are either not optically transparent (e.g. traditional dynamic speakers) or rely on piezoelectric materials to achieve optical transparency. However, piezoelectric transducers do not achieve adequate performance levels and are acoustically inferior to electrostatic transducers. The present application describes several novel approaches to optically transparent electrostatic transducers.

One exemplary embodiment of such an optically transparent transducer has an optically transparent or semi-transparent two-dimensional membrane electrostatic diaphragm having a plurality of atomic layers; optically transparent spacers, electrodes and interconnects; wherein this transducing device absorbs less than 20% of incident light between wavelengths of 390 nm and 780 nm for an optically transparent transducer and less than 50% of incident light between wavelengths of 390 nm and 780 nm for a semi-transparent transducer. The electrostatic diaphragm may be less than 30 atomic layers thick. In a preferred embodiment, the electrostatic diaphragm comprises graphene.

Each individual transparent transducer can function as a wideband acoustic microphone or speaker. In such a configuration, the function of each individual transducer is independent of the function of any other transducer. Transducers of the present application have many uses. In particular, such transducer can be utilized in applications such as high-fidelity audio playback and recording, subsonic sensing (such as geological surveying), and ultrasonic sensing (such as near field communications (NFC), imaging, range finding, echo location, structural stress failure monitoring, and motion capture). Such transducers are well-suited for electronics devices with displays, such as laptop computers, tablets, televisions, and cellular phones to either replace or augment the acoustic functionalities of these devices with ultrawideband transducers integrated directly onto the display surface.

SUMMARY OF PREFERRED EMBODIMENTS

It is therefore one object of the application to provide a transparent electrostatic transducing device. It is another object to provide a transparent electrostatic transducing device which can be manufactured in high volume with low cost. It is another object to provide a method of manufacturing a transparent electrostatic transducing device. It is another object of the present application to provide devices incorporating such transparent electrostatic transducing devices.

In the context of the present application, a "semi-transparent" material or device is a material or device which absorbs less than 50% of incident light between the wavelengths of 390 nm and 780 nm.

In the context of the present application, an "optically transparent" material or device is a material or device which absorbs less than 20% of incident light between the wavelengths of 390 nm and 780 nm.

Some embodiments of the present application include materials that absorb less than 10% of incident light between wavelengths of 390 nm and 780 nm. Some embodiments of the present application include materials that absorb less than 5% of incident light between wavelengths of 390 nm and 780 nm. In particular, graphene has been reported to absorb approximately 2.3% of incident light (A. B. Kuzmenko et al., Universal optical conductance of graphite, Phys. Rev. Lett. 100, 117401 (2008)). Additionally, h-BN has been reported to absorb less than 1% of incident light (L. Song et al., Large scale growth and characterization of atomic hexagonal boron nitride layers, Nano Lett. 10, 3209-3215 (2010)).

In the context of the present application, a "two-dimensional" material is a material with a layered crystal structure, having a thickness of one to one thousand atomic layers. Examples of such two-dimensional materials include but are not limited to graphene, silicene, germanene, silicane, germanane, h-BN, $MoS_2$, and metals such as stanene. The two-dimensional materials may (in some embodiments) be combined with conductive or semiconductive plastics/polymers, semiconductors, and conductive or semiconductive ceramics (e.g. electroceramics) or further combinations thereof. Such two-dimensional materials may be suitable as materials for the electrostatic diaphragm according to at least some of the embodiments of the present application.

One exemplary embodiment of an optically transparent transducer has an optically transparent or semi-transparent two-dimensional electrostatic diaphragm having a plurality of atomic layers, wherein the electrostatic diaphragm absorbs less than 20% of incident light (for the transparent case) or less than 50% of incident light between wavelengths of 390 nm and 780 nm (for the semi-transparent case). The electrostatic diaphragm may optionally be less than 30 atomic layers thick.

In a preferred embodiment, the electrostatic diaphragm comprises graphene. In another preferred embodiment, the electrostatic diaphragm comprises graphene and h-BN in a bi-layer laminated structure, wherein both the graphene and h-BN materials are multiple atomic layers thick. In still another preferred embodiment, the electrostatic diaphragm comprises both graphene and h-BN in a tri-layer laminated structure with graphene as the outer layers sandwiching an h-BN layer in-between. In another preferred embodiment, the electrostatic diaphragm comprises both graphene and h-BN in a tri-layer laminated structure with h-BN as the outer layers sandwiching a graphene layer in-between. The electrostatic diaphragm may also be comprised of silicene, germanene, silicane, germanane, h-BN, $MoS_2$, and metals such as stanene. The two-dimensional materials may (in some embodiments) be combined with conductive or semi-conductive plastics/polymers, semiconductors, and conductive or semiconductive ceramics (e.g. electroceramics) or further combinations thereof.

In a preferred embodiment, the transducer has a first and second optically transparent spacer, and each first and second spacer has a large round, sheet, or roll format with conductive patterning onto which one side of the electrostatic diaphragm is bonded. The first and second spacer each have a substantially circular open region defining circular portions above and below the electrostatic diaphragm. The transducer has a first and second transparent electrode, and each first and second electrode has a large round, sheet, or roll format with conductive patterning. The first and second electrodes are arranged on opposite sides of the electrostatic diaphragm proximate to one side of the electrostatic diaphragm and the first or second spacer. The transducer has a plurality of patterned electrically conductive and optically transparent interconnects, and the interconnects are electrically connected an external electrical signal. In particular, the interconnects can have one lead for each electrode and one lead connected to the diaphragm.

In one preferred embodiment, to maintain transparency (regardless of discrete, custom matrix, or multiplex array format), transducer interconnect lines may be made using established processes from flexible PCB and flat panel display manufacturing technologies which are optically transparent.

In another preferred embodiment, the transducer has electrical circuitry arranged externally to the optically transparent transducer. The electrical circuitry is electrically connected to the first and second electrodes and to the diaphragm, wherein the electrical circuitry is configured for (1) sensing changes in current, voltage, and/or capacitance to function as a microphone, and/or (2) producing changes in current, voltage, and/or capacitance to function as a speaker to produce audio, subsonic, or ultrasonic signals from the diaphragm.

In yet another preferred embodiment, the electrostatic transducer has an open active diaphragm of circular, elliptical, square, rectangular, rounded rectangular, kidney, star, n-polygonal, or of another irregular shape.

In another exemplary embodiment, the transparent transducer operates at the following gap distances and voltages:
a diaphragm-to-electrode gap between approximately 0.1 mm and approximately 1 mm;
a $V_{DC}$ on the diaphragm of between approximately 20V and approximately 4 kV;
a $V_{signal}$ on the first and second electrodes of $V_{RMS}$ between approximately 20V and approximately 4 kV.

In another exemplary embodiment, the transparent transducer operates at the following gap distances and voltages:
a diaphragm-to-electrode gap of approximately 1 mm;
a $V_{DC}$ on the diaphragm of approximately 4 kV;
a $V_{signal}$ on the first and second electrodes of $V_{RMS}$ of approximately 4 kV.

In still another exemplary embodiment, the transparent transducer operates at the following gap distances and voltages:
a diaphragm-to-electrode gap of approximately 0.1 mm;
a $V_{DC}$ on the diaphragm of approximately 20V and up to approximately 60V;
a $V_{signal}$ on the first and second electrodes of $V_{RMS}$ of approximately 20V.

In another preferred embodiment, the first and second electrodes comprise an optically transparent substrate with a thin, optically transparent, and conductive film coated on one surface. Optionally, the optically transparent substrate is made from glass, quartz, acrylic, polyethylene, PET, PE, or PP, or combinations thereof or other similar material that are also commonly used and would be familiar to those of ordinary skill in the art. Optionally, the film is made from indium tin oxide (ITO), Poly(3,4-ethylenedioxythiophene) (PEDOT), indium zinc oxide (IZO), graphene, or carbon nanotubes, or combinations thereof or other similar material that are also commonly used and would be familiar to those of ordinary skill in the art.

In another preferred embodiment, the first and second electrodes have a transparent insulating film layer of silicon dioxide ($SiO_2$), h-BN, polyethylene, or a combination thereof or other similar material that are also commonly used and would be familiar to those with experience in the field.

In still another exemplary embodiment, the transducer has a layer of acrylic, polyester, silicone, polyurethane, halogenated plastic, or a combination thereof formed on one or both sides of the electrostatic diaphragm to substantially cover the electrostatic diaphragm surface. Optionally, the layer is continuous to substantially cover the entire electrostatic diaphragm surface or, in the alternative, the layer is patterned and removed from central regions of the electrostatic diaphragm surface so that it remains only along an outer perimeter of the electrostatic diaphragm to provide additional mechanical strength for clamping the electrostatic diaphragm along the perimeter.

In yet another exemplary embodiment, the transducer has a photo-active layer formed on one or both sides of the electrostatic diaphragm to substantially cover the electrostatic diaphragm surface. Optionally, the photo-active layer can be selectively removed in any desired pattern to tune, enhance or modulate a diaphragm excursion profile in response to applied electrostatic forces. In a preferred embodiment, the photo-active layer comprises a photoresist.

In another preferred embodiment, the photo-active layer is formed on one or both sides of the diaphragm to substantially cover the surface. Optionally, both the photo-active layer and the electrostatic diaphragm can be selectively removed in any desired pattern to tune, enhance or modulate the diaphragm's excursion profile in response to applied electrostatic forces.

There are various methods for making transparent transducers according to the present application. One exemplary method includes providing a first multilayer construction having a first transparent electrode and first transparent spacer. The method includes providing an optically transparent or semi-transparent electrostatic diaphragm, and providing a second multilayer construction comprising a second transparent electrode and second transparent spacer. Subsequently, the method includes aligning and attaching the electrostatic diaphragm to the first multilayer construction using a first transparent adhesive. Then, the method includes aligning and attaching the second multilayer construction to the diaphragm using a second transparent adhesive.

In a preferred embodiment of the method, the electrostatic diaphragm comprises graphene. In another preferred embodiment, the electrostatic diaphragm comprises h-BN and graphene layers subsequently laminated together.

In another preferred embodiment of the method, at least the first adhesive or the second adhesive permits an electric current to cross the adhesive and pass to the diaphragm.

In yet another exemplary embodiment of the method, the method includes prior to providing the graphene, patterning an additional thin layer of a material other than graphene on the graphene of the electrostatic diaphragm, wherein the additional thin layer is patterned such that it is located (a) only along an outer perimeter of the diaphragm, (b) to create a desired displacement pattern across the diaphragm surface to essentially tune or enhance the diaphragm's excursion profile in response to applied electrostatic forces, or (c) to allow selective removal of the diaphragm in some regions to form a desired pattern of holes in the diaphragm. In a preferred embodiment, the patterning utilizes a technique selected from the group consisting of photolithography, shadow-mask, lift-off, polishing, ink-jet printing, 3D-printing, or screen-printing or other process that would be familiar to those with experience in the field.

In one exemplary embodiment, the transducers or transducer packages of the present application many be manufactured using traditional semiconductor manufacturing and chip packaging processes and equipment. In a preferred embodiment, the diaphragm component, which is a composite two-dimensional layered material having high mechanical strength and optical transparency, is manufactured and integrated into the device by scalable manufacturing processes and equipment such as those use for flat panel displays, flexible circuit boards, or MEMS devices as examples. In another preferred embodiment, once packaged, the transducers can be singulated in a discrete format or arranged into a custom matrix format, or can remain in a panel, roll, or sheet format as a multiplexed array.

In another preferred embodiment, the electrostatic diaphragm is provided with a sacrificial layer which is removed after the electrostatic diaphragm is aligned and attached.

The transducers according to the present application also may be arranged in arrays of devices to accomplish specific design objectives. On embodiment of such an array of transparent transducing devices includes a plurality of transparent transducing devices according to one of the embodiments of the application. Optionally, the plurality of transparent transducers are arranged in a custom array or an as-fabricated contiguous multiplex array of devices.

In another preferred embodiment, the plurality of transparent transducing devices are interconnected and work as a mono-speaker. In still another preferred embodiment, the plurality of transparent transducing devices are interconnected and work as a large area microphone. In yet another preferred embodiment, the plurality of transparent transducing devices are interconnected such that individual or areas of speakers can be multiplexed and used as different speaker channels and microphones.

In an exemplary embodiment, the individual transducers of an array have a square or rectangular area with one side length between approximately 0.3 mm and approximately 300 mm. Optionally, an individual transducer has a square or rectangular area with one side length of approximately 0.3 mm for small handheld display. Optionally, an individual transducer has a square or rectangular area with one side length of approximately 300 mm for a large screen display.

Further objects, features, and advantages of the present application will become apparent from the detailed description of preferred embodiments which is set forth below when considered together with the figures of drawing.

BRIEF DESCRIPTION OF THE DRAWINGS

FIG. 1 depicts an exemplary embodiment of a transducer (1) according to the present application. A basic configuration of such a preferred embodiment has five primary components, as shown. In particular, the transducer has two (2) electrodes (E1 and E2). The electrode may be made of an optically transparent substrate (for example a glass/ceramic like quartz, or a polymer like acrylic) with a thin optically transparent and conductive film coated on one surface (for example a transparent conducting oxide like Indium-Tin Oxide (ITO), or a transparent conducting polymer like Poly(3,4-ethylenedioxythiophene), known as PEDOT, or a nano material like carbon nanotubes). In a preferred embodiment, thin glass plates would have ITO evaporated or sputter deposited onto one surface, these processes would be familiar to a person of ordinary skill in the art. In one embodiment, the electrode conductive film is exposed to the cavity and in another embodiment, they are coated with an additional transparent insulating film (for example an oxide like silicon dioxide, or a ceramic like hexagonal boron nitride (h-BN), or a polymer like polyethylene) to prevent electrical shorting between the electrode and the Diaphragm. These thin insulating films could be evaporated or sputter deposited or spin-coated, and these processes would be familiar to a person of ordinary skill in the art.

FIG. 1 also includes two (2) spacers S1 and S2; made of an optically transparent material, with similar requirements as the electrode substrate and thus the same materials may be used (for example a glass/ceramic like quartz or etc.). In a preferred embodiment, a single glass spacer is bonded (with a clear glue or clear pressure sensitive adhesive (PSA) to each electrode. The last component is one (1) Diaphragm made of either pure graphene or an h-BN/graphene composite film. In a preferred embodiment, the diaphragm (D1) is a composite film made of layered h-BN-graphene-h-BN in a sandwich structure.

FIG. 1 also shows an electrostatic diaphragm (D1). The diaphragm can be as small as 1 mm in diameter for audio applications and 0.1 mm for ultrasonic applications or as large as 30 mm in some applications. As multiplexed arrays for displays, the individual transducers (1) may be on the small side of this spectrum for mobile hand held devices or other such devices with smaller video displays that would be typically used for close viewing/listening. And for other larger displays meant for much more distant viewing the transducer sizes will most likely be larger, much more towards 30 mm in size. The transducer diaphragm (D1) may be a circular shape, or an arbitrary shape depending on the application and audio engineering design, which is then integrated into the shape and layout of the respective parts.

Figure 1:
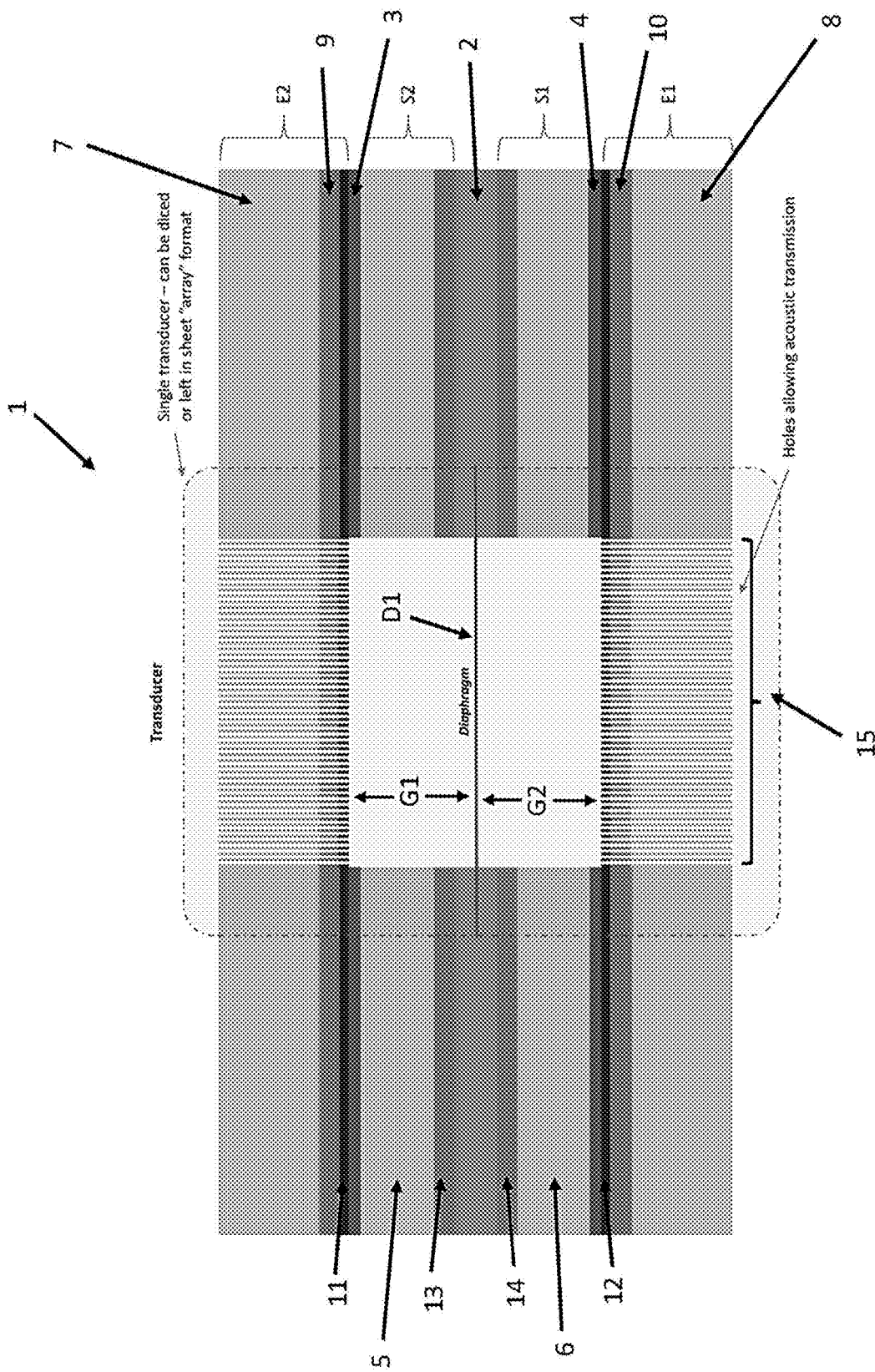
FIG. 1 shows an exemplary embodiment of a transducer according to the present application.

The transducer (1) can be fabricated in sheets, rounds or rolls because the fabrication process (as is described in journal articles and the UC patents) involves templated growth on metal substrates, removal of the metal substrates, and suspension on mechanical support frames.

Spacing between individual devices or between components within a device may vary depending on the application; however, it is critically important to maintain tight process control over the spacing between components within the device active area, which is the space between the two electrodes (E1, E2) and the diaphragm (D1) (in the directions normal to the top and bottom diaphragm surfaces). These regions, typically referred to as "gap" regions (G1, G2), are where acoustic waves are transduced. The gap (G1, G2) should be of uniform size both sides of each device to maintain symmetry in signal forces inducing the diaphragm to product sound. Gapping can vary from device to device depending on acoustic design, however it is likely for simplicity in manufacturing that all devices will work at similar gaps.

The components of the transducer (1) are bonded in such a way as to maintain optical transparency. One method is to use optically transparent glues/epoxies (2, 3, 4) (purple and green layers). The bond (3, 4) between the spacers and the electrodes (purple) only requires that it be mechanically sound, whereas the bond (2) between the spacers and the diaphragm (green) on at least one side is required to be electrically conductive for the conduction of charge to the diaphragm. The bond (2) may be made with an optically transparent conductive glue (for example an acrylic-based epoxy, or a silicone-based adhesive, with carbon particles in suspension for higher conductivity), or with a traditional conducting material patterned with very narrow linewidths to minimize light absorption (for example a screen-printed silver ink line pattern), or a traditional UV epoxy which is sufficiently thin to have sufficient conduction to operate the device. In fact, high conductivity is not necessarily a requirement for charging the diaphragm, but nevertheless may be provided, as very small current flow into or out of the diaphragm is desired.

The electrode substrate (E1, E2) and spacer layers (S1, S2), if made of rigid dielectric (5, 6, 7, 8) e.g. glass/ceramic, providing structural integrity and planarity to the device; however, it is conceivable that when manufactured in an array that flexible transparent materials (https://www.sciencedirect.com/science/article/pii/S0141938216 300026) could be used with transparent rigid inserts or no-flex polymer modified zones to maintain device planarity but allow for some ability to contour or "flex" the array device for installation and use. For a transducer custom matrix or multiplex array configuration, composite electrode and spacer layers may be made such that the transducer diaphragm open area is rigid and the areas between are flexible. For an individual transducer, flexible electrode and spacer layers may be used with a transparent conducting polymer such as PEDOT (Polyethylenedioxythiophene).

The devices may be fabricated in sheets, rolls, or wafers. For larger diameters, simple pin alignments can be utilized to assemble/glue the layers to each other. For smaller geometries, it would be desirable to use layer to layer alignment fiducials and methods typically used in flat panel display manufacturing and/or MEMS fabrication. The diaphragm (D1) materials are fabricated using traditional CVD methods on large sheets of seed layer materials. Once deposited, these sheets are blanket aligned directly over one of the device spacer layers, adhered with a thin PSA layer and then processed to remove the seed layer. The spacer and diaphragm layered structure is then incorporated into the device stack up by aligning and gluing to one electrode and then subsequently aligning and adhering the opposite spacer and electrode.

In some configurations the graphene layer can be continuous across the entire array or fabrication sheet/area; or it may also be patterned and interconnected to provide different multiplexed transducer operating parameters. All layers can be patterned using traditional CNC cutting and drilling and/or other lithography techniques as typically used in printed circuit board, flat panel display or MEMS manufacturing for each layer of the device as it is being built.

When fully assembled the transducers (1) are optically transparent, thin and energy efficient. Device thickness varies based on gap spacing, interconnect structures and the type/thickness of electrode and spacer material used, wherein device thickness can range from as thin as 0.5 mm up to 5 mm. The overall weight is a function of device thickness, but in general the transducers are about 10% of the weight of the equivalent speaker diaphragm area for a traditional dynamic speaker. This weight reduction is largely due to the elimination of the permanent magnets. Since the system is voltage dependent and directly couples the forces to the diaphragm, several studies have indicated that energy consumption should be significantly lower.

The electrode layers (E1, E2) can optionally be fabricated using flat panel display or PCB methods from an optically transparent material such as glass, quartz, acrylic, lexan or other polymer that is thinly coated with Indium-Tin Oxide (ITO) or other such transparent conductors such as Indium Zinc Oxide or other conducting oxides, PEDOT, or other conducting polymers, graphene, carbon nanotubes, or other composites containing nanoparticles for improved electrical conductivity. The electrodes have one or more appropriately-sized holes (15) to open the acoustic cavity so that the diaphragm (D1) can transmit (or receive) acoustic waves. Acoustic transmittal hole size and patterns can be adjusted to vary acoustic impact, however the impact on viewing should also be considered. These holes can be mechanically drilled, laser drilled, etched, molded, imprinted or ablated prior to assembly and should be of small enough size and periodicity to provide minimal optical viewing impact and optimal acoustic transmittance. Such processes would be familiar for a person with ordinary skill in the art. With use of semiconductor etching methods, these acoustic transmittal holes (15) can be as small as one micron with a pitch having 25-40% open area.

An exemplary embodiment of the electrode would be manufactured, in this example for a multiplexed array format, starting with a glass panel, coating it with ITO, pattern/etch the ITO to form a first layer of interconnects, then sputter silicon dioxide and pattern/etch contacts. The electrode is finished by drilling or etching the acoustic transmittal holes. Glass thicknesses can vary but are generally similar to those used in flat panel display manufacturing −0.2 mm to 1 mm. Interconnect layers can be relatively thin films of 0.5 to 2.5 microns, but also thicker film processes using 25 micron or 1 mil thicknesses can be easily accommodated.

The spacers (S1, S2) are simple transparent dielectric spacing layers (5, 6) similar to that of the electrode such as glass, polymer, acrylic, or other optically transparent material, with a conducting layer of ITO or transparent metals (e.g. strontium vanadate). The diaphragm acoustic cavity area forming the gaps (G1, G2) is formed using etching, drilling or ablating techniques and then layered into the construction of the device. These processes would be familiar to a person with ordinary skill in the art. In most configurations the conducting layer can be left continuous as the devices can be designed to all operate using the same VDC; however, the ITO layer can be patterned so that some devices could have differing operational VDCs applied to the diaphragms. In an exemplary embodiment, larger area transducers may be driven at higher voltage to enhance low frequency performance of the transparent transducer.

A typical manufacturing process for the spacer layers would be to start with a glass sheet, coat with ITO, pattern and etch ITO as an optional step, and then pattern through the glass (and ITO) to pattern the transducer active area. This spacer can now be aligned and glued to its corresponding electrode. As discussed previously this can be done in a sheet to sheet glue up process like typically done in display manufacturing or perhaps in a roll-to-roll glue and bond scenario.

The thickness of the spacer layers (S1, S2) generally determines the distance from the diaphragm (D1) to the electrodes (E1, E2). In a preferred embodiment, the gap distance (G1, G2) from diaphragm-to-electrode would be symmetric and thus the electrostatic forces would be equal on the diaphragm (D1), so the same spacer thickness is used on both sides. The electrostatic forces on the diaphragm (D1) drops by the inverse square with distance, so it is important for the gap to be as close as possible while at the same time giving the diaphragm ample room for excursion. Depending on several factors, gaps can vary from 0.001 mm to up to 1 mm.

The diaphragm layer (D1) is typically manufactured using CVD processes and may be pure graphene and preferably limited to 1-30 monolayers of sp2 hybridized carbon film in one embodiment. Thicker graphene films having larger numbers of layers are also possible but may be less desirable since each layer attenuates approximately 2.3% of light transmission (Mak K F, Sfeir M Y, Wu Y, Lui C H, Misewich J A, Heinz T F. Measurement of the optical conductivity of graphene. Phys Rev Lett. 2008; 101:196405). To ensure robust mechanical performance (particularly for larger transducers), a composite film using multi-layer h-BN (boron nitride), which is optically transparent, of greater than 50 atomic layers thick (up to thousands of layers thick), could optionally be combined with the thin graphene film to improve structural integrity. Another embodiment may add an outer layer of graphene on both sides of the h-BN to provide the conductivity necessary for DC charging. Using h-BN maintains the low mass density and strength of graphene while being optically transparent (S. M. Kim, A. Hsu, M. H. Park, S. H. Chae, S. J. Yun, J. S. Lee, D.-H. Cho, W. Fang, C. Lee, T. Palacios, M. Dresselhaus, K. K. Kim, Y. H. Lee, and J. Kong: Synthesis of large-area multilayer hexagonal boron nitride for high material performance. *Nat. Commun.* 6, 8662 (2015)). Another embodiment would be the inverse sandwich structure, with graphene in the middle and h-BN on either outer surface.

The diaphragm layer (D1) is deposited in a CVD furnace on a seed layer material. The h-BN multilayer film is grown by a similar process (Jang, S. K.; Youn, J.; Song, Y. J.; Lee, S. Synthesis and Characterization of Hexagonal Boron Nitride as a Gate Dielectric. *Sci. Rep.* 2016, 6, 30449; Kim, S. M.; Hsu, A.; Park, M. H.; Chae, S. H.; Yun, S. J.; Lee, J. S.; Cho, D.-H.; Fang, W.; Lee, C.; Palacios, T.; et al. Synthesis of Large-Area Multilayer Hexagonal Boron Nitride for High Material Performance. *Nat. Commun.* 2015, 6, 8662.) If a bi-layer or tri-layer composite film is used a multi-step sequential deposition process can be used. Alternatively, the individual layers could be grown separately and then laminated together after the CVD furnace growth. The deposition substrate material is removed and the diaphragm material is transferred onto one spacer layer, after which the other layers of the composite can be added.

Another embodiment of the transparent transducer would have a multilayer and patterned diaphragm with not only graphene and/or h-BN layers, but also with a transparent polymer film such as poly-methylmethacrylate (PMMA), other acrylic, photoresist, polyester, silicone, polyurethane, halogenated plastic layer, or nanocellulose. This additional film layer may be on one or both sides of the diaphragm as a mechanical support or to tune the acoustic performance. The additional film layer may also be patterned and selectively removed from one or both sides of the diaphragm by photolithographic, lithographic, ashing, sputtering, or other process to tune the acoustic and mechanical performance. The additional film layer may serve also as a pattern to selectively remove regions of the diaphragm itself by laser ablation, sputtering, or lithographic process to tune the acoustic and mechanical performance of the transparent transducer.

Like a traditional electrostatic transducer, the electrodes (E1, E2) are separated from the diaphragm (D1) by spacers (S1, S2) on either side. The "gap" (G1, G2) between the electrode (E1, E2) and the diaphragm (D1) is determined by the thickness of these spacers (S1, S2). When each spacer (S1, S2) is the same thickness, this forms a symmetric device. A DC voltage is applied to charge the diaphragm (D1) and an audio signal is applied to the electrodes, typically using a push/pull configuration to produce sound. When the transducer is used as a microphone the configuration is slightly different as one electrode is grounded and the other electrode is monitored for electrical current caused by acoustic wave displacement of the diaphragm affecting capacitance changes.

Figure 2:
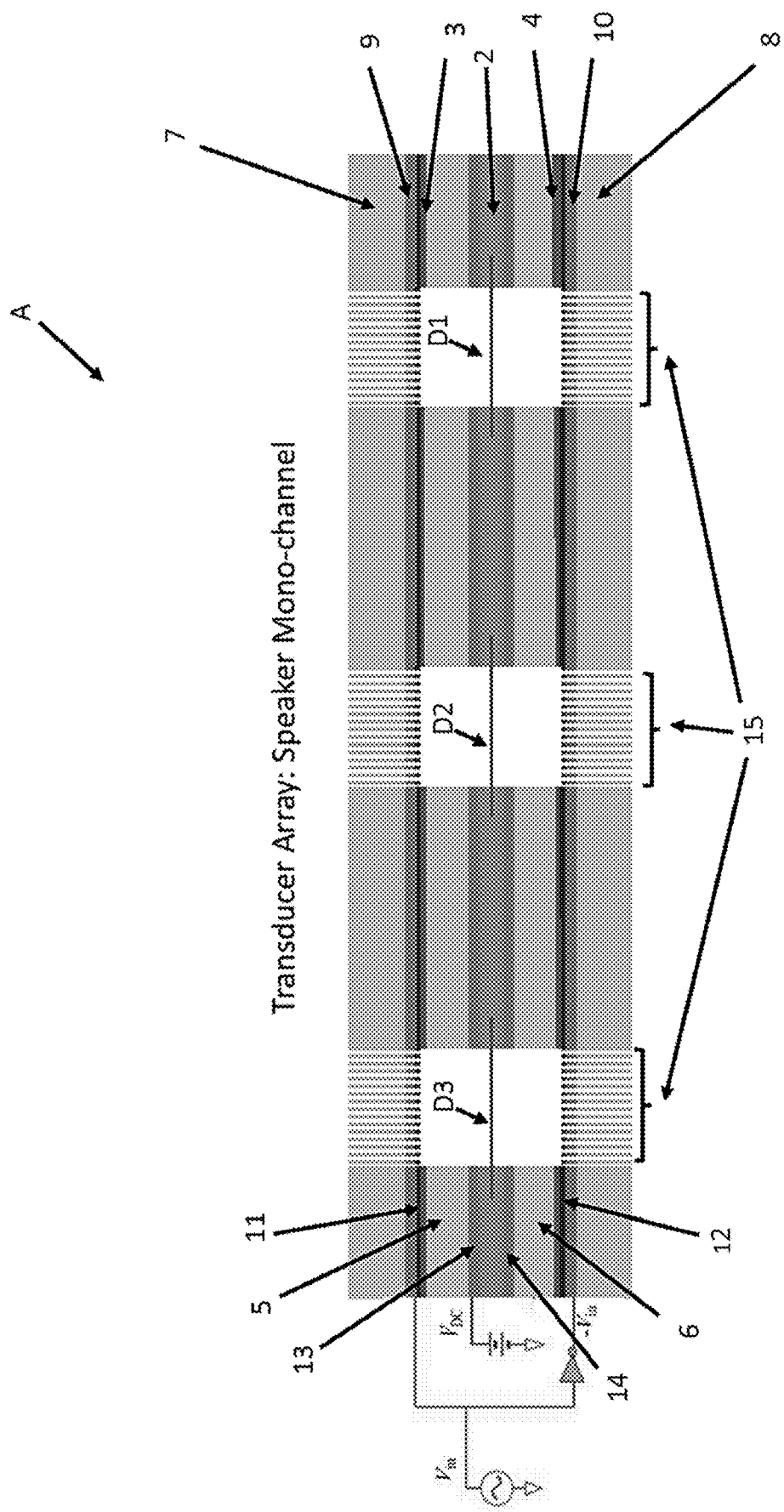
FIG. 2 shows an exemplary embodiment of an array of transducers according to the present application configured as a mono-channel speaker.
Figure 3:
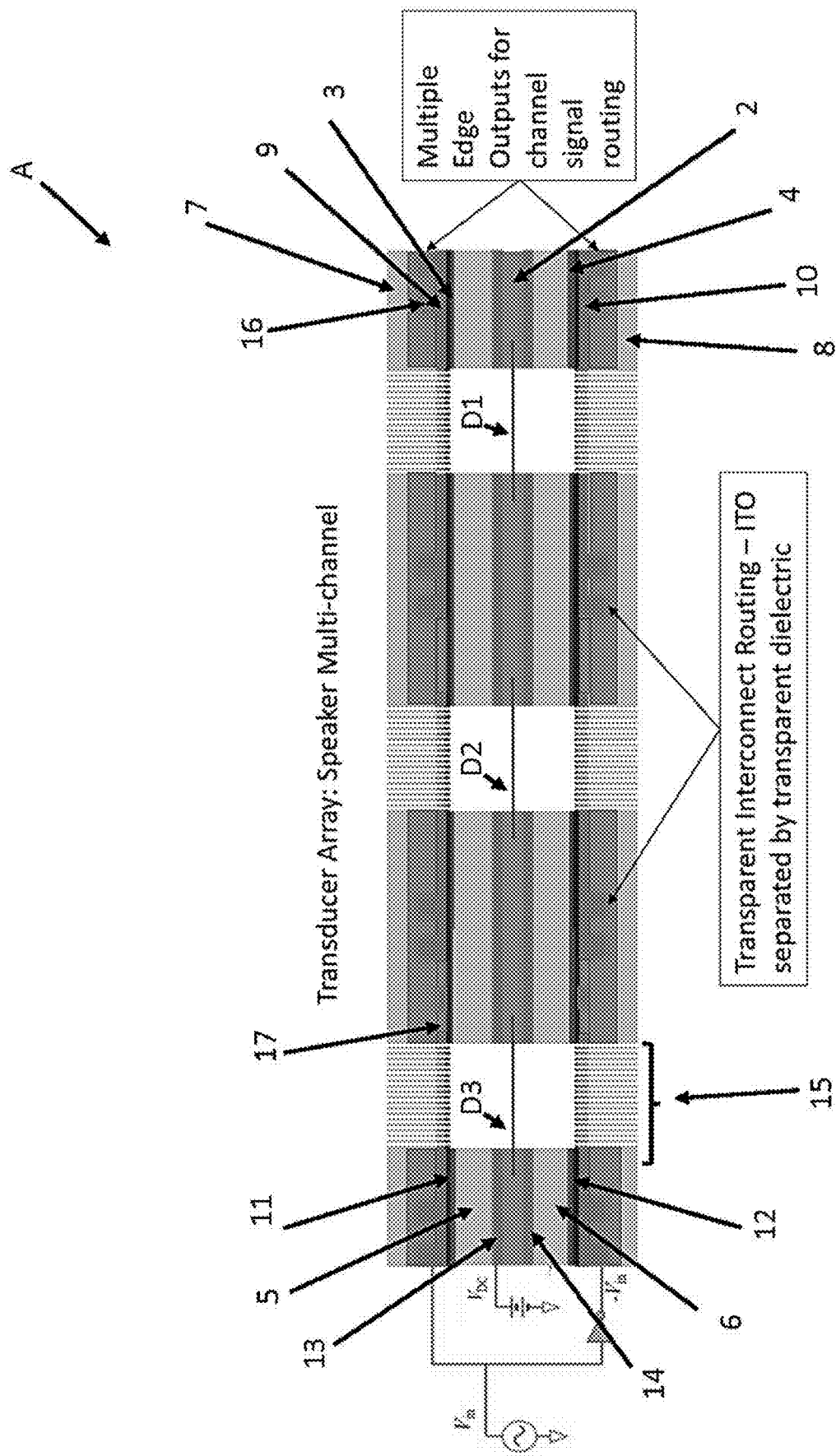
FIG. 3 shows an exemplary embodiment of an array of transducers according to the present application configured as a multi-channel speaker or a multi-channel microphone.
Figure 4:
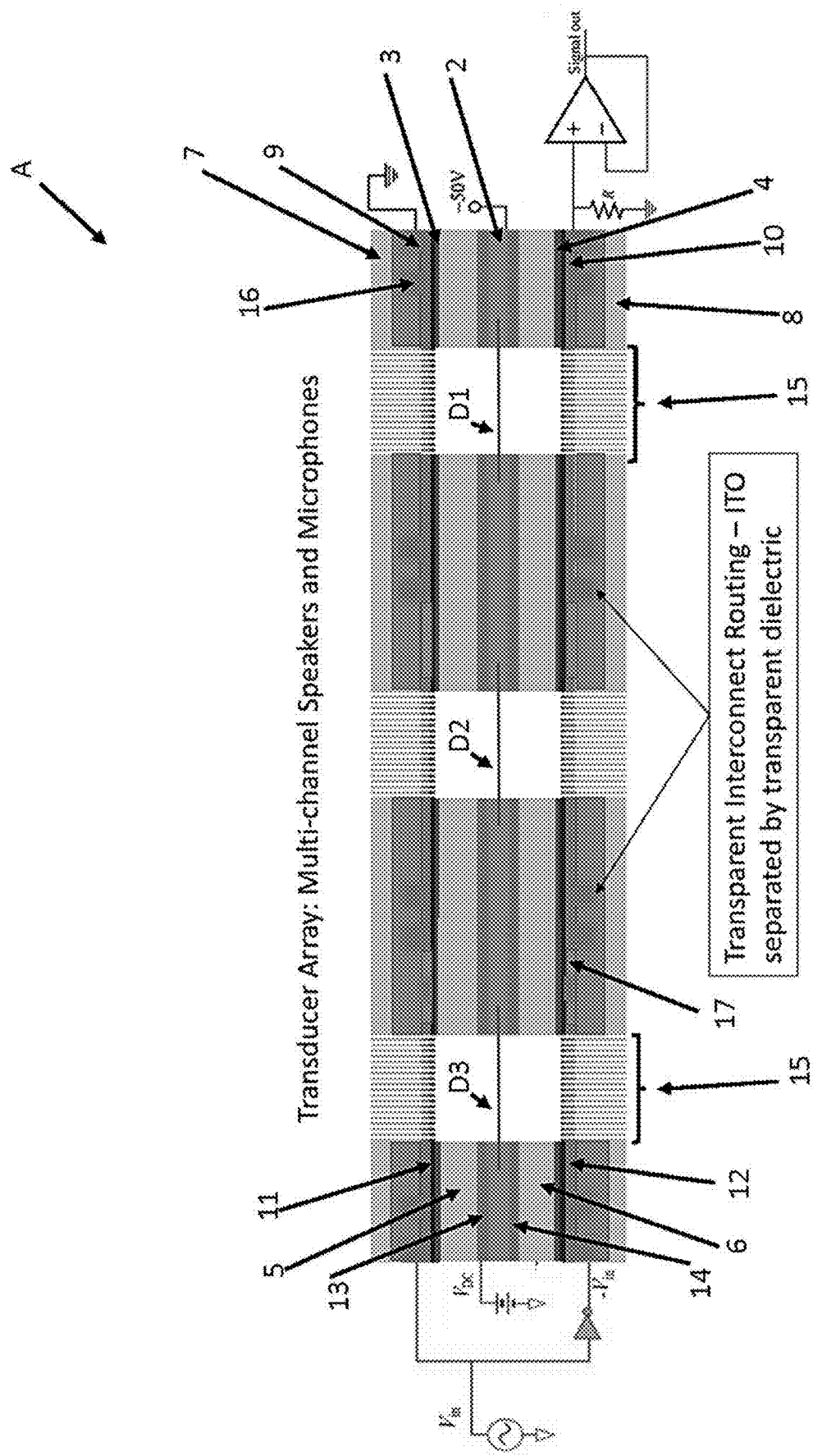
FIG. 4 shows an exemplary embodiment of an array of transducers according to the present application configured as multi-channel speakers and microphones.

As an array, the device could be fully dedicated to producing acoustic waves (FIGS. 2-3) (subsonic, audible sound and ultrasonic), fully dedicated as an ultra-wideband microphone (FIG. 3) or could be partitioned with transducers performing each of those tasks simultaneously (FIG. 4). In one embodiment transducers could be fixed as either a speaker or a microphone; and in another each transducer could be switched from microphone to speaker so that the overall device configuration could be altered for the intended application. With the ability to address and control individual transducers in a multiplexed array, the ability to simultaneously have some transducers operating as audio speakers and others as microphones would also be demonstrated.

As a speaker the array device could produce mono channel sound (FIG. 2) or be interconnected to produce multi-channel sound (FIG. 3). Multichannel speakers could be as simple as stereo or more complex with pixelated zones of groups of transducers or as complex as each individual transducer being individually addressed. In a display application, the appearance of multiple individuals singing (channels) in one image could have audio speakers within the array projecting the singing of each individual (channel) from the displayed position of that individual (channel). For a multiplexed speaker arrangement, the devices would be connected to a common DC diaphragm voltage and with each channel's audio signal delivered separately. This would be accomplished by using common semiconductor manufacturing or display manufacturing methods to pattern device interconnects in the spaces between transducers in the E1 and E2 layers; and with the possibility of additional transparent connecting layers being added for more complex channel designs.

As a microphone the array device could detect sound either through one channel or multi-channels in a similar method as described above, with one electrode layer attached to ground and the second electrode connected in mono or in multichannel mode to detect the changes in voltage or capacitance as acoustic waves hit the diaphragm.

When the array device is affixed to a display device or any other surface, it may also be desirable to use a transparent stand-off layer between the display and the transducer array. This stand-off layer is meant to eliminate interference or imaging effects resulting from the back-volume acoustics of the transducer interacting with the forward-volume acoustics that may cause undesirable degradation of the desired forward-volume acoustics. The stand-off layer can be integrated within the patterned conductor path(s) or embedded within the array's cross-sectional area to produce optimal acoustics for the array device.

In preferred embodiments, the diaphragm in the device has a diameter of approximately 10 mm. In another preferred embodiment, the diaphragm has a diameter of approximately 20 mm. In another preferred embodiment, the diaphragm has a diameter of 1 µm to 10 µm. In another preferred embodiment, the diaphragm has a diameter of 10 µm to 100 µm. In another preferred embodiment, the diaphragm has a diameter of 100 µm to 1 mm. In another preferred embodiment, the diaphragm has a diameter of 40 µm to 1 mm. In another preferred embodiment, the diaphragm has a diameter of 1 mm to 10 mm. In another preferred embodiment, the diaphragm has a diameter of 1 mm to 35 mm. In another preferred embodiment, the diaphragm has a diameter of 1 mm to 100 mm. In another preferred embodiment, the diaphragm has a diameter of 10 mm to 20 mm. In another preferred embodiment, the diaphragm has a diameter of 10 mm to 100 mm. In another preferred embodiment, the diaphragm has a diameter of 100 mm to 1000 mm. In another preferred embodiment, the diaphragm has a diameter of 1000 mm to 10 cm. In another preferred embodiment, the diaphragm has a diameter of approximately 1 mm. In another preferred embodiment, the diaphragm has a diameter of approximately 10 mm. In another preferred embodiment, the diaphragm has a diameter of approximately 20 mm. In another preferred embodiment, the diaphragm has a diameter of approximately 30 mm. In another preferred embodiment, the diaphragm has a diameter of approximately 40 mm. In another preferred embodiment, the diaphragm has a diameter of approximately 50 mm. In another preferred embodiment, the diaphragm has a diameter of approximately 60 mm. In another preferred embodiment, the diaphragm has a diameter of approximately 70 mm. In another preferred embodiment, the diaphragm has a diameter of approximately 80 mm. In another preferred embodiment, the diaphragm has a diameter of approximately 90 mm. In another preferred embodiment, the diaphragm has a diameter of approximately 100 mm.

The electrostatic diaphragm may optionally be less than 100 atomic layers thick. The electrostatic diaphragm may optionally be less than 50 atomic layers thick. The electrostatic diaphragm may optionally be less than 40 atomic layers thick. The electrostatic diaphragm may optionally be less than 30 atomic layers thick. The electrostatic diaphragm may optionally be less than 20 atomic layers thick. The electrostatic diaphragm may optionally be less than 10 atomic layers thick. The electrostatic diaphragm may optionally be between 10 and 50 atomic layers thick. The electrostatic diaphragm may optionally be between 20 and 50 atomic layers thick. The electrostatic diaphragm may optionally be between 30 and 50 atomic layers thick. The electrostatic diaphragm may optionally be between 40 and 50 atomic layers thick. The electrostatic diaphragm may optionally be between 10 and 40 atomic layers thick. The electrostatic diaphragm may optionally be between 20 and 40 atomic layers thick. The electrostatic diaphragm may optionally be between 20 and 30 atomic layers thick. The electrostatic diaphragm may optionally be between 10 and 30 atomic layers thick. The electrostatic diaphragm may optionally be between 20 and 30 atomic layers thick. The electrostatic diaphragm may optionally be between 10 and 20 atomic layers thick.

The foregoing description of preferred embodiments has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

REFERENCE NUMERALS

A transducer array
D1 diaphragm
D2 diaphragm
D3 diaphragm
E1 electrode layer
E2 electrode layer
G1 gap
G2 gap
S1 spacer layer
S2 spacer layer
1 transducer
2 glue/epoxy
3 glue/epoxy
4 glue/epoxy
5 dielectric material of spacer
6 dielectric material of spacer
7 dielectric material of electrode
8 dielectric material of electrode
9 conductive layer of electrode layers
10 conductive layer of electrode layers
11 second dielectric layer of electrode layers
12 second dielectric layer of electrode layers
13 conductive layer of spacer layers
14 conductive layer of spacer layers
15 openings in electrodes
16 interconnect conductive materials
17 interconnect dielectric materials

The invention claimed is:

1. An optically transparent or semi-transparent transducing device comprising:
   an optically transparent or semi-transparent two-dimensional membrane electrostatic diaphragm having a plurality of atomic layers, wherein the electrostatic diaphragm absorbs less than 50% of incident light between wavelengths of 390 nm and 780 nm, wherein the electrostatic diaphragm is less than 30 atomic layers thick, wherein the electrostatic diaphragm comprises graphene;
   a first and second optically transparent spacer, wherein each first and second spacer comprises a large round, sheet, or roll format with conductive patterning onto which one side of the electrostatic diaphragm is bonded, wherein the first and second spacer each have a substantially circular open region defining circular portions above and below the electrostatic diaphragm; and
   a first and second transparent electrode, wherein each first and second transparent electrode comprises a large round, sheet, or roll format with conductive patterning, wherein the first and second transparent electrodes are arranged on opposite sides of the electrostatic diaphragm proximate to one side of the electrostatic diaphragm and the first or second spacer.

2. The transparent or semi-transparent transducing device according to claim 1, further comprising: a plurality of patterned electrically conductive and optically transparent interconnects, wherein the interconnects are electrically connected an external electrical signal, wherein the interconnects have one lead for each electrode and one lead connected to the graphene diaphragm,
electrical circuitry arranged externally to the optically transparent transducer, wherein the electrical circuitry is electrically connected to the first and second transparent electrodes and to the graphene diaphragm, wherein the electrical circuitry is configured for (1) sensing changes in current, voltage, and/or capacitance to function as a microphone, and/or (2) producing changes in current, voltage, and/or capacitance to function as a speaker to produce audio, subsonic, or ultrasonic signals from the graphene diaphragm.

3. The transparent or semi-transparent transducing device according to claim 1,
wherein the electrostatic diaphragm comprises both graphene and h-BN in a bi-layer laminated structure, wherein both the graphene and h-BN materials are multiple atomic layers thick.

4. The transparent or semi-transparent transducing device according to claim 3,
wherein the transparent transducer operates at the following gap distances and voltages:
a diaphragm-to-electrode gap of approximately 1 mm;
a $V_{DC}$ on the diaphragm of approximately 4 kV;
a $V_{signal}$ on the first and second transparent electrodes of $V_{RMS}$ of approximately 4 kV.

5. The transparent or semi-transparent transducing device according to claim 3,
wherein the transparent transducer operates at the following gap distances and voltages:
a diaphragm-to-electrode gap of approximately 0.1 mm;
a $V_{DC}$ on the diaphragm of approximately 20V and up to approximately 60V;
a $V_{signal}$ on the first and second transparent electrodes of $V_{RMS}$ of approximately 20V.

6. The transparent or semi-transparent transducing device according to claim 1,
wherein the electrostatic diaphragm comprises both graphene and h-BN in a tri-layer laminated structure with graphene as the outer layers sandwiching an h-BN layer in-between.

7. The transparent or semi-transparent transducing device according to claim 1,
wherein the electrostatic diaphragm comprises both graphene and h-BN in a tri-layer laminated structure with h-BN as the outer layers sandwiching a graphene layer in-between.

8. The transparent or semi-transparent transducing device according to claim 1, wherein the first and second transparent electrodes comprise an optically transparent substrate with a thin, optically transparent, and conductive film coated on one surface, wherein the optically transparent substrate comprises a material selected from the group consisting of: glass, quartz, acrylic, polyethylene, PET, PE, or PP; and wherein the film comprises a material selected from the group consisting of: indium tin oxide (ITO), Poly(3,4-ethylenedioxythiophene) (PEDOT), indium zinc oxide (IZO), graphene, or carbon nanotubes.

9. The transparent or semi-transparent transducing device according to claim 1,
wherein the electrostatic transducer has an open active diaphragm, wherein the open active diaphragm area is of circular, elliptical, square, rectangular, rounded rectangular, kidney, star, n-polygonal, or of another irregular shape.

10. The transparent or semi-transparent transducing device according to claim 9, wherein the first and second transparent electrodes further comprise a transparent insulating film layer comprising silicon dioxide ($SiO_2$), h-BN, or polyethylene.

11. The transparent or semi-transparent transducing device according to claim 1,
wherein the transparent transducer operates at the following gap distances and voltages:
a diaphragm-to-electrode gap between approximately 0.1 mm and approximately 1 mm;
a $V_{DC}$ on the diaphragm of between approximately 20V and approximately 4 kV;
a $V_{signal}$ on the first and second transparent electrodes of $V_{RMS}$ between approximately 20V and approximately 4 kV.

12. The transparent or semi-transparent transducing device according to claim 1, further comprising:
a layer comprising an acrylic, polyester, silicone, polyurethane, or halogenated plastic formed on one or both sides of the electrostatic diaphragm to substantially cover the electrostatic diaphragm surface, wherein the layer is continuous to substantially cover the entire electrostatic diaphragm surface or the layer is patterned and removed from central regions of the electrostatic diaphragm surface so that it remains only along an outer perimeter of the electrostatic diaphragm to provide additional mechanical strength for clamping the electrostatic diaphragm along the perimeter.

13. The transparent or semi-transparent transducing device according to claim 1, further comprising:
a photo-active layer is formed on one or both sides of the electrostatic diaphragm to substantially cover the electrostatic diaphragm surface, wherein the photo-active layer can be selectively removed in any desired pattern to tune, enhance or modulate a diaphragm excursion profile in response to applied electrostatic forces.

14. The transparent or semi-transparent transducing device according to claim 13,
wherein the photo-active layer comprises a photoresist.

15. The transparent or semi-transparent transducing device of claim 13,
wherein the photo-active layer is formed on one or both sides of the diaphragm to substantially cover the surface, wherein both the photo-active layer and the electrostatic diaphragm can be selectively removed in any desired pattern to tune, enhance or modulate the diaphragm's excursion profile in response to applied electrostatic forces.

16. The transparent or semi-transparent transducing device of claim 1,
wherein the electrostatic diaphragm absorbs less than 20% of incident light between wavelengths of 390 nm and 780 nm.

17. A method of manufacturing the transparent transducing device of claim 1, comprising the following steps:
providing a first multilayer construction comprising the first transparent electrode and first transparent spacer; and
providing the optically transparent or semi-transparent electrostatic diaphragm comprising graphene; and
providing a second multilayer construction comprising the second transparent electrode and the second transparent spacer; and subsequently aligning and attaching the electrostatic diaphragm to the first multilayer construction using a first transparent adhesive; and subsequently aligning and attaching the second multilayer construction to the diaphragm using a second transparent adhesive.

18. The method according to claim 17,
wherein the electrostatic diaphragm comprises h-BN and graphene layers subsequently laminated together.

19. The method according to claim 17,
wherein at least the first adhesive or the second adhesive permits an electric current to cross the adhesive and pass to the electrostatic diaphragm.

20. The method according to claim 17,
wherein prior to providing the graphene, patterning an additional thin layer of a material other than graphene on the graphene of the electrostatic diaphragm, wherein the additional thin layer is patterned such that it is located (a) only along an outer perimeter of the diaphragm, (b) to create a desired displacement pattern across the diaphragm surface to essentially tune or enhance the diaphragm's excursion profile in response to applied electrostatic forces, or (c) to allow selective removal of graphene in some regions to form a desired pattern of holes in the graphene diaphragm.

21. The method according to claim 20,
wherein patterning utilizes a technique selected from the group consisting of photolithography, shadow-mask, lift-off, polishing, ink-jet printing, 3D-printing, or screen-printing.

22. The method according to claim 17,
wherein the electrostatic diaphragm is provided with a sacrificial layer which is removed after the electrostatic diaphragm is aligned and attached.

23. An array of transparent transducing devices comprising:
a plurality of transparent transducing devices according to claim 1, wherein the plurality of transparent transducers are arranged in a custom array or an as-fabricated contiguous multiplex array of devices.

24. The array of transparent transducing devices according to claim 23,
wherein the plurality of transparent transducing devices are interconnected and work as a mono-speaker.

25. The array of transparent transducing devices according to claim 23,
wherein the plurality of transparent transducing devices are interconnected and work as a large area microphone.

26. The array of transparent transducing devices according to claim 23,
wherein the plurality of transparent transducing devices are interconnected such that individual or areas of speakers can be multiplexed and used as different speaker channels and microphones.

27. The transparent transducing device according to claim 23,
wherein the individual transducer has a square or rectangular area with one side length between approximately 0.3 mm and approximately 300 mm.

28. The transparent transducing device according to claim 23,
wherein the individual transducer has a square or rectangular area with one side length of approximately 0.3 mm for small handheld display.

29. The transparent transducing device according to claim 23,
wherein the individual transducer has a square or rectangular area with one side length of approximately 300 mm for a large screen display.

* * * * *